3,117,957
Patented Jan. 14, 1964

3,117,957
REACTIVE POLYMERIC DYES CONTAINING TRIAZINE
Samuel Neil Boyd, Jr., Salem, N.J., and Donald James Gale and Roy Emerson Starn, Jr., Wilmington, Del., assignors to E. I. du Pont de Nemours and Company, Wilmington, Del., a corporation of Delaware
No Drawing. Filed Dec. 19, 1958, Ser. No. 781,480
4 Claims. (Cl. 260—153)

This invention relates to novel compositions of matter useful as reactive dyes for materials possessing in their structure exchangeable hydrogen atoms. More particularly, this invention deals with dyes for textile fiber and similar materials (including paper, leather, plastic film, etc.) which possess in their molecules or micelles reactive radicals such as OH, ONa or $NH_2$. Common illustrations of such materials are cellulosic fiber, wool, silk, nylon and polyvinyl alcohol film.

It is an object of this invention to provide novel reactive dyes for the above purpose which are characterized by a high degree of fixation, good build-up, and excellent fastness qualities to washing. A further object is to provide a novel series of dyes whereby the shade to be obtained on the fiber may be varied at will and determined in advance, during the synthesis of the dye. Other objects and achievements of this invention will become apparent as the description proceeds.

Reactive dyes constitute a new type of dye of relatively recent development. In these dyes, the dyeing capacity depends, not on physical affinity between the dye and fiber, but on direct chemical reaction (with covalent bonds) between the dye and certain reactive radicals in the fiber. The dyes in such cases generally possess chlorotriazine radicals, which react with the OH and $NH_2$ radicals occurring in the fiber. A typical illustration of such dyes may be found in U.S.P. 2,795,576.

Reactive dyes of the above types suffer, however, generally from incomplete fixation. As already indicated, these dyes possess chlorotriazine radicals such as

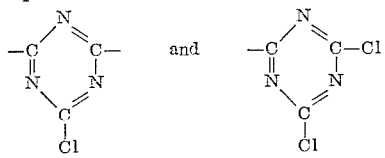

which react with the radicals OH or $NH_2$ on the fiber to split off HCl. Application of the dye to the fiber is generally done from an aqueous bath containing sufficient alkali (e.g. $Na_2CO_3$ or NaOH) to absorb the HCl liberated. The chlorotriazine radicals, however, also have a strong tendency to react with water, whereby the Cl groups become replaced by OH. In the latter form the triazine radical no longer has any tendency to react with the fiber. Consequently, two concurrent reactions take place in the dye bath in which the fiber and the water from the dye bath compete for the dye molecules. The result is that only a portion of the dye added to the dye bath binds to the fiber, while the remainder, having undergone hydrolysis, is eventually washed out when the dyed fiber is rinsed. Customarily, only some 50 to 70% of the added dye becomes thus usefully consumed, and this is spoken of as a 50 to 70% fixation.

Now, we have found that dyeings of a very high degree of fixation, often approaching 100%, and possessing high fastness qualities to washing are obtained by the use of a novel class of reactive dyes, which form an integral part of this invention and which are more fully described hereinbelow.

The novel dyes of this invention distinguish primarily from hitherto known reactive dyes in being of a polymeric structure. Also, they are essentially free of any dichlorotriazine radicals. They do possess, however, monochlorotriazine radicals and sufficient sulfonic acid radicals to make the dye water soluble. More particularly, our novel class of dyes are water-soluble compounds containing a plurality of dye chromophores, a plurality of monochlorotriazine radicals (at least one for each chromophore) and a plurality of sulfonate groups (at least one for each chromophore), the triazine radicals being joined to the dye portions of the molecule or to other triazine radicals through NH links. As a particular illustration of the above general class of novel dyes, the subclass expressed by the following formula may be mentioned at this point:

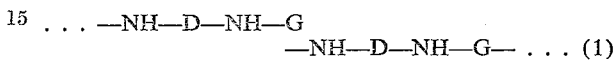

wherein G represents the divalent monochlorotriazine radical of the formula

while the D's represent divalent radicals of compounds containing at least one chromophore and an average of at least one alkali-metal sulfonate group for each chromophore, the polymer chains being terminated by members of the group consisting of $H_2N$—D, G—Cl and G—OH, D and G having the same meaning as above.

The nature and function of a chromophore is well known to those engaged in the art of producing coloring materials. See for instance The Chemistry of Synthetic Dyes and Pigments edited by H. A. Lubs, page 663. But for our present purpose, the meaning of D in the above formula may be restated by saying that D is the divalent radical of a water-soluble dye. Thus, D may be the radical obtained by removing 2 hydrogen atoms from any water-soluble dye of the monoazo or disazo series, anthraquinone series, dioxazine, phthalocyanine, safranine, triarylmethane, rhodamine series, etc. Furthermore, the radical D may include in its structure monochlorocyanuric radicals other than those explicitly represented above by the G's of the polymeric chain.

Our invention, however, is not limited to dyes in which the D's and G's follow each other with simple regularity as in the above formula, but include dyes within the broad definition above wherein the D's and G's are connected in any sequence, for instance

. . . —NH—D—NH—G—A—G
—NH—D—NH—G—A—G— . . . (2)

or

. . . —NH—D—B—D—NH—G—A—G—NH
—D—B—D—NH—G—A—G— . . . (3)

wherein A and B are any links whatever. Generally however, the link from G to any other portion of the molecule (A or D) is, as already said, of the form NH.

Several methods are available for synthesizing the novel polymers defined by the above formulas. Some of these methods form the subject matter of other applications by one or two of us, filed simultaneously herewith. For instance, one may start with a diamino derivative of a water-soluble dye of the formula $H_2N$—D—$NH_2$, wherein D has the same meaning as above, and condense the same in substantially equimolecular proportions with a cyanuric halide such as the chloride or bromide.

Using hereinafter the chloride as the typical and most commonly available of the two, the condensation involves elimination of HCl, and is therefore conducted in the presence of an acid-absorbing agent such as sodium carbonate, hydroxide or acetate. The condensation is preferably carried out in two successive stages, involving different temperature levels, the dye being dissolved in water, while the cyanuric chloride is dissolved in a convenient water-miscible solvent, for instance acetone, or is simply dispersed in the aqueous medium.

The first temperature stage is about 0° to 5° C., and taking the preparation of a dye of Formula 1 above as typical, this first stage is believed to result in a monomer of the formula $$H_2N-D-NH-G-Cl \quad (4)$$

In the second stage, which is carried out at a temperature of 10° to 70° C., the said monomer condenses further to give a polymer of the above indicated structure.

As an alternative procedure, it is possible to start with an isolated monomer of formula $H_2N-D-NH-G-Cl$, which may have been obtained by condensing, in suitable manner, any components which will result in such a monomer. In this event, the condensation required for the production of the dye polymers of this invention comprises but a single stage, namely, heating in the presence of an acid-absorbing agent at a temperature between 10° and 70° C.

Because of the random nature of the condensation process, and because there may be present during the second stage some residual, uncondensed molecules of form $H_2N-D-NH_2$ and $Cl-G-Cl$, each polymeric chain may contain at either of its terminals, a radical selected at random from the group $D-NH_2$ and $G-Cl$. But because of the strong tendency of the cyanuric chloride to hydrolyze in the presence of water at temperatures above 20° C., the bulk of the terminal $G-Cl$ groups will be replaced by $G-OH$, in other words, the radical of form

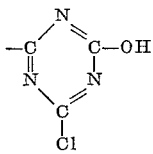

Consequently, the polymeric chains will terminate, at either end, in radicals selected at random from the group consisting of $D-NH_2$, $G-Cl$ and $G-OH$.

In the average case, all the D's in the polymer will be alike. It is possible, however, to start with a mixture of dye-diamines say of form $H_2N-D-NH_2$ and $$H_2N-D'-NH_2$$

whereby the resulting polymeric chains will contain the dye radicals D and D' intermixed at random, the average ratio of D' to D being, however, proportional to the original ratio of the two dye diamines. In this fashion, the shade or other quality of the eventual dyeing may be modified at will and predetermined in advance. For instance if an orange dye of form $H_2N-D'-NH_2$ is intermixed with a blue dye of form $H_2N-D-NH_2$, in suitable proportions, prior to condensation with cyanuric chloride, grey and black dyes may be prepared.

The above mode of synthesis is not exclusive, and may in some cases be replaced by other processes which will result in a chain containing a plurality of chromophores and of monochlorocyanuric rings within the scope of Formulas 1, 2 and 3 above. For instance, in the case of azo dyes, the chlorotriazine radical of form G may be incorporated in the coupling component or in the diazo component. Then, by choosing, for instance, a coupling component which is capable of coupling in 2 places, and by reacting the same with the tetrazo compound resulting from an aromatic diamine, a polymeric chain will be formed in the process of coupling. The terminal radicals, however, in this instance will be somewhat different than above. The group of possible terminal radicals in this instance will still include OH (resulting from decomposition of a diazonium chloride radical in alkaline medium), but this OH group will be attached to a benzene ring instead of the cyanuric ring. The group will also include the radical of the coupling component as one possibility.

Without limiting this invention the following examples are given to illustrate our preferred mode of operation. Parts mentioned are by weight.

PART I. SYNTHESIS

Example 1

2-(p-aminoanilino)-5-nitrobenzenesulfonic acid is diazotized in conventional manner and coupled in alkaline solution to the monosodium salt of H acid (8-amino-1-naphthol-3,6-disulfonic acid). After salting out and filtering off, the resulting filter cake is subjected to reduction in customary manner with sodium sulfide, to convert the $NO_2$ group into $NH_2$. The product when isolated is a blue powder, and has the formula

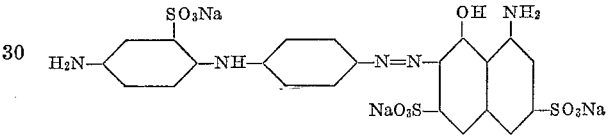

A quantity of the above blue powder containing 13.5 parts (0.02 mole) of diaminoazo dye (the actual quantity being adjusted for salt content or other solid diluents) is dissolved in 500 parts of water and the solution is adjusted to pH 7 and cooled to 5° C.; 2.8 parts of crystalline sodium acetate are then added. Then 40 parts of an acetone solution containing 3.7 parts (0.02 mole) of cyanuric chloride are added. The solution is stirred for one hour at a temperature between 0° and 5° C. while maintaining the pH between 6 and 7 by adding 2 N sodium hydroxide.

At this point, the mass is believed to contain in solution a monomer of the formula

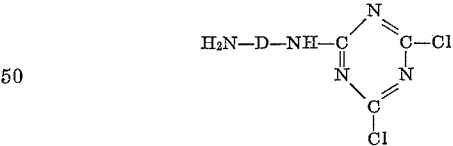

wherein D represents the formula of the above blue azo dye minus its two $NH_2$ groups.

The solution is then warmed to room temperature, stirred for 18 hours, warmed to 40°–45° C. and stirred an additional 45 minutes. After adjusting the pH to 7.5 with 2 N sodium hydroxide solution, 120 parts of sodium chloride are added, the product is filtered off and dried under a vacuum. The resultant powder dissolves in water to give a blue coloration.

The blue, water-soluble polymer obtained is believed to have the following formula:

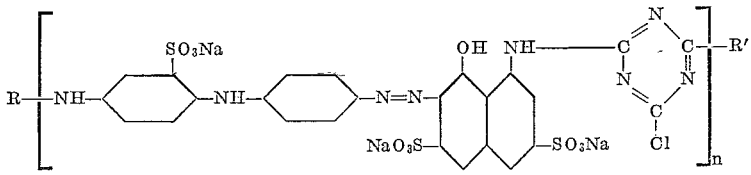

wherein $n$ is not less than 2; R represents H, GCl or GOH (G having the same meaning as above; i.e. it represents the monochlorotriazine radical $C_3N_3Cl$); and R' represents Cl, OH or a molecule of said diamino monoazo blue dye attached by one of its amine groups.

Example 2

4-amino-4'-nitro-2,2'-stilbenedisulfonic acid is diazotized in conventional manner and coupled, in alkaline medium, to 1 - (m - aminophenyl)-3-methyl-5-pyrazolone. After salting out and filtering off, the mononitro product is reduced to the $NH_2$ stage, by the aid of sodium sulfide, in conventional manner. The product, when isolated, is an orange powder having the formula

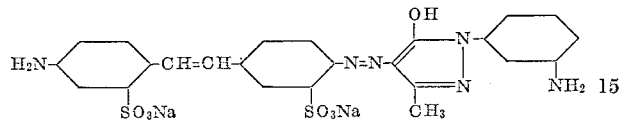

A quantity of the above powder containing 13.5 parts of the pure dye (0.022 mole) is dissolved in 250 parts of water. The solution is adjusted to pH 7, cooled to 5° C. and 2.8 parts of crystalline sodium acetate are added. Then 40 parts of an acetone solution containing 3.7 parts (0.02 mole) of cyanuric chloride are added. The solution is stirred for one hour at a temperature between 0° and 5° C. and for another hour at a temperature between 20° and 25° C. while maintaining the pH between 6 and 7 by adding 2 N sodium hydroxide. The solution is then warmed to 40°–45° C. for 45 minutes, salted and filtered. The orange colored polymer thus obtained is dried in a vacuum. The resulting orange powder dissolves in water to give an orange coloration. The orange, water-soluble polymer thus obtained is believed to have the following formula:

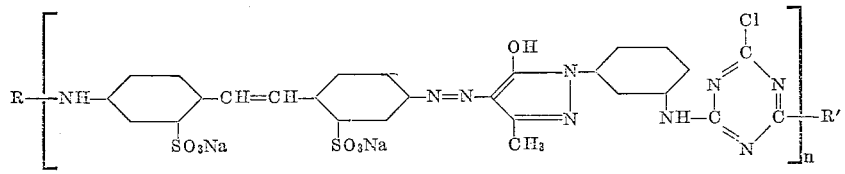

wherein $n$ is not less than 2; R represents H, GCl or GOH; and R' represents Cl, OH or a bond to either amino group of the diamino monoazo orange dye employed as starting material for the condensation.

Example 3

The condensation step of Example 1 is repeated, except that in lieu of using 13.5 parts of the blue diaminoazo dye, a mixture containing 10.8 parts of said blue dye and 2.7 parts of the orange diaminoazo dye of Example 2 is employed. The resulting copolymer, when isolated as in Example 1, is a black powder, dissolving in water to give a black coloration.

Example 4

34.7 parts of 4,4'-diamino-2,2'-biphenyldisulfonic acid were tetrazotized in conventional manner and coupled in alkaline solution to 52.2 parts of 2-amino-8-naphthol-6-sulfonic acid. To the resulting ice cold mass, containing in solution the disazo dye of formula

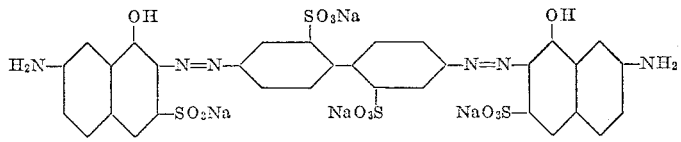

is added a solution of 18.5 parts of cyanuric chloride in 80 parts of acetone, and the whole is agitated for 1.5 hours at 0° to 5° C., while maintaining the pH at 8 with 2 N $Na_2CO_3$. The reaction mass is then heated at 35°–40° C. for 2 hours during which time the pH is held at 8 by adding 2 N $Na_2CO_3$ to neutralize the HCl formed in the reaction. The solution is cooled to 20° C., salted, filtered and the filter cake is dried. The resulting polymeric product is a red dye. Its structure corresponds to the general formula hereinabove, except that D here is the divalent radical of the disazo dye indicated by the above formula.

Example 5

An ice cold slurry is prepared by adding a solution of 18.5 parts of cyanuric chloride in 80 parts of acetone to 500 parts of cold water (0° to 5° C.). An ice cold solution of 37 parts of 4,4'-diamino-2,2'-stilbene disulfonic acid in 100 parts of water, adjusted with 2 N NaOH to pH 11, is added. The resulting mixture is agitated at 0° to 5° C. for 2 hours, while the pH is maintained at 8 with 2 N $Na_2CO_3$. At this point the reaction mass contains in solution a monomeric condensation product of the formula

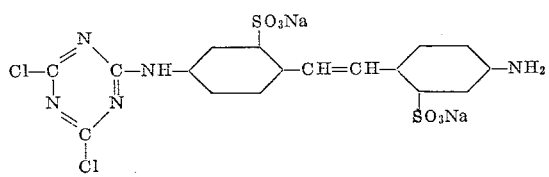

This compound is then diazotized and coupled to m-toluidine in conventional manner.

The resulting product, which is a monomer of type $H_2N$—D—NH—GCl (D and G having the same meaning as above), is polymerized in situ, by heating the aqueous coupling mass at 40° C. for 2.5 hours, while the pH is maintained at 9 with 2 N $Na_2CO_3$. The pH is then brought to 7 with 2 N HCl, the solution is cooled to 20° C., and the polymeric dye is isolated by salting and filtering.

Example 6

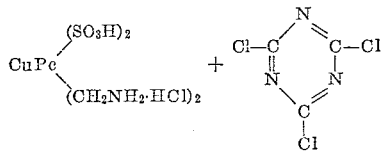 + 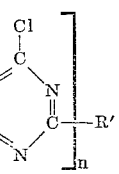

43.3 parts (0.05 mole) of the di-HCl salt of copper di(aminomethyl)-phthalocyanine-disulfonic acid are dissolved in 100 parts of water while keeping the pH at 6 with 2 N $Na_2CO_3$, and the solution is cooled to 0° to 5° C. A solution of 18.5 parts (0.1 mole) of cyanuric chloride in 80 parts of acetone is added, with enough ice to keep the temperature of the mixture below 5° C. The resulting slurry is agitated at 0° to 5° C. for 2 hours; then the pH is adjusted to 6 with 2 N $Na_2OC_3$, and the solution is stirred at room temperature for 24 hours.

The pH is adjusted to 7 with 2 N $Na_2CO_3$, and the polymeric dye is isolated by salting and filtering. A polymeric copper phthalocyanine dye which dyes cotton turquoise shades with good wash-fastness is obtained.

The aminomethyl-phthalocyanine starting material is prepared by adding N-hydroxymethyl-phthalimide to a solution of copper phthalocyanine in 10% oleum at 80°

C. followed by drowning on ice and hydrolyzing the resulting amide.

Example 7

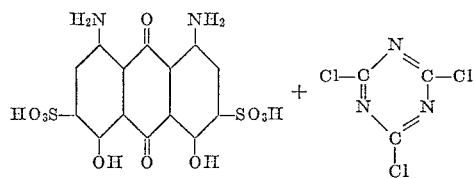

48.9 parts (0.1) mole) of 1,8-diamino-4,5-dihydroxy-3,6-anthraquinone-disulfonic acid are dissolved in 100 parts of water while keeping the pH at 6 with 10 N NaOH. The solution is cooled to 0° to 5° C., and a solution of 18.5 parts (0.1 mole) of cyanuric chloride in 80 parts of acetone is added, together with enough ice to keep the temperature at 0° to 5° C. The resulting slurry is agitated at 0° to 5° C. for 2 hours; the pH is then adjusted to 6 with 2 N $Na_2CO_3$, and the solution is stirred at room temperature for 48 hours.

The pH is then adjusted to 7 with 2 N $Na_2CO_3$ and the blue dye is filtered off. A polymeric anthraquinone dye which dyes cotton blue shades with good wash-fastness is obtained. The internal unit of the polymeric dye has the probable structure

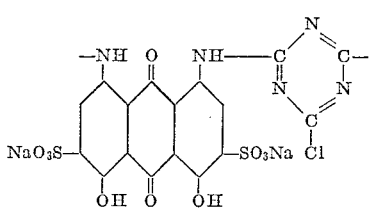

Example 8

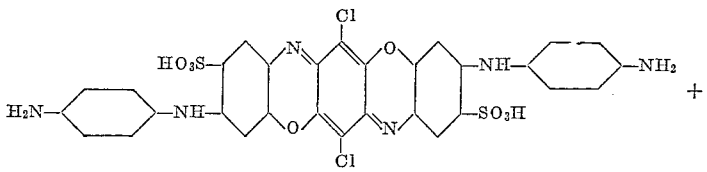

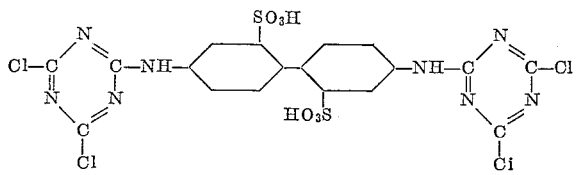

36.4 parts (0.05 mole) of the blue diaminodioxazine shown above is slurried in 500 parts of water and the pH is adjusted to 6 with 2 N $Na_2CO_3$.

A solution of 17.2 parts (0.05 mole) of 4,4'-diamino-2,2'-biphenyldisulfonic acid in 100 parts of water is prepared while keeping the pH at 7 with solid $Na_2CO_3$. The pH is then adjusted to 6 with 2 N HCl and the solution is cooled to 0° to 5° C. To this solution is added a solution of 18.5 parts (0.1 mole) of cyanuric chloride in 80 parts of acetone along with enough ice to keep the temperature below 5° C. The resulting slurry is stirred at 0° to 5° C. for 2 hours before the pH is adjusted to 6 with 2 N $Na_2CO_3$, and the above slurry of the diaminodioxazine is added. The resulting slurry is agitated at room temperature for 24 hours before the pH is adjusted to 7 with 2 N $Na_2CO_3$. The dye is then isolated by salting (using 50 parts of NaCl) and filtering. A polymeric blue dye with good light- and wash-fastness is obtained.

It will be noted that the dye in this case has the general chain-form (2) above, but it may also be fitted into form (1) if it be stipulated that in this case each group D comprises within its structure the G—A type radical:

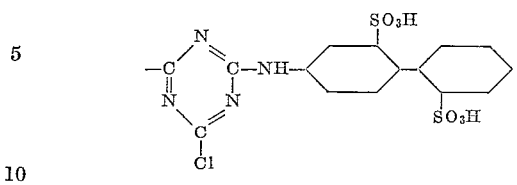

apart from the G's explicitly shown in Formula 1.

Example 9

If the diaminodioxazine dye in Example 8 is replaced by 23.8 parts (0.05 mole) of the diaminoazo dye represented by the formula

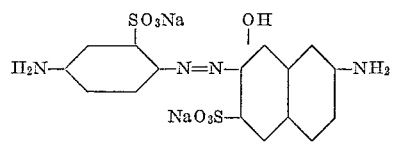

a violet polymeric reactive dye is formed which shows excellent wash fastness when dyed on cotton.

Example 10

(a) *Preparation of coupling component.*—A solution of 47.8 parts of 2-amino-8-naphthol-6-sulfonic acid in 390 parts of water was adjusted to pH 7 by addition of 10 N NaOH, and then added slowly to a suspension of cyanuric chloride, prepared by adding a solution of 18.5 parts of cyanuric chloride in 112 parts of acetone to 400 parts of ice and 300 parts of water, so that the temperature remained at 0° to 5° C. The resulting mixture was stirred for ten minutes at 0° to 5° C., brought to pH 7 with 2 N $Na_2CO_3$ and heated to 35° to 40° C. for two hours. The reaction mixture was then salted with 225 parts of NaCl, cooled to room temperature and filtered and dried to give 65 parts of material which is probably the di-condensation product,

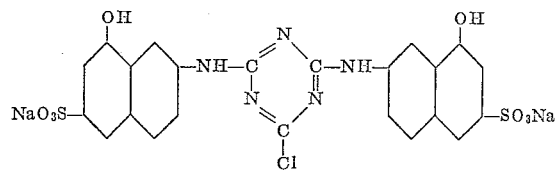

(b) *Coupling and polymerization.*—To an ice cold solution made up of 15.8 parts of the dihydroxy compound of the above formula (0.025 mole) and 8.2 parts of sodium acetate trihydrate in 1000 parts of water was added an aqueous suspension of the tetrazonium chloride obtained in customary manner from 6.9 parts of 4,4'-diamino-2,2'-biphenyl-disulfonic acid (0.02 mole). The mass was then agitated at 0° to 5° C. for 30 minutes, salted with 525 parts of NaCl, filtered and dried. The red polymeric dye thus obtained probably has the structure

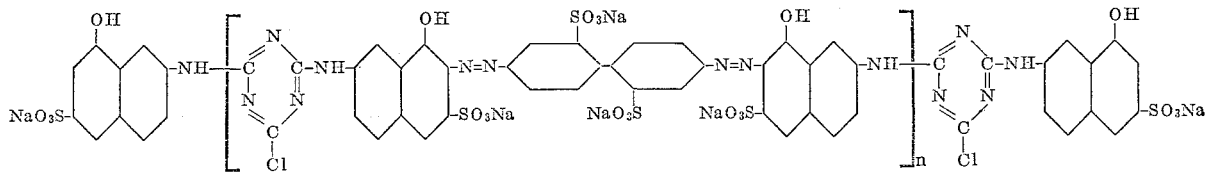

wherein $n$ is not less than 2.

Example 11

In 150 parts of water are dissolved 31.9 parts (0.1 mole) of 1-amino-8-naphthol-3,6-disulfonic acid while keeping the pH at 7 with 2 N Na₂CO₃, and the solution is cooled to 0° to 5° C. To this solution is then added a solution of 18.5 parts of cyanuric chloride in 80 parts of acetone along with enough ice to keep the temperature below 5° C. The slurry thus formed is held at 0° to 5° C. for 20 minutes, at which time a test for free amine (diazotization and coupling) shows that the amino-naphthol is completely condensed.

To the above solution are added 18.8 parts (0.1 mole) of 2,4-diaminobenzene-sulfonic acid, the pH is adjusted to 6 with 2 N Na₂CO₃, and the resulting solution is agitated at room temperature for 20 hours. The pH is then adjusted to 7 with 2 N Na₂CO₃ to redissolve what had come out of solution, and after two more hours at room temperature the solution is cooled to 0° to 5° C. The compound thus formed in solution has the probable structure

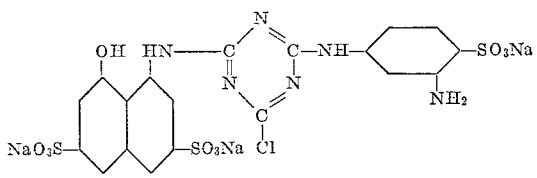

To the above solution are added 35 parts of 37% HCl followed by 25 parts of 5 N NaNO₂. After five minutes at 0° to 5° C. the pH is adjusted to and maintained at 8 with 2 N Na₂CO₃, while agitating the diazo solution for one hour at this temperature. The solution is filtered to remove a small amount of insoluble material. The filtrate is salted, using 150 parts of NaCl, filtered, and the filtered solids are dried to give a red product which dyes cotton in bright blue-red shades of good wash-fastness. Its fixation on cotton is 83%.

The filtrate from the red product is salted further, using 50 parts of NaCl and filtered to give an additional yield of a dry red powder of similar dyeing qualities, which exhibits and 87% fixation on cotton.

The filtrate from the last step is salted with an additional 100 parts of NaCl and filtered to yield a dry red powder which exhibits an 88% fixation on cotton.

All three fractions of the red dye show excellent wash-fastness. All three fractions are believed to be polymers containing the periodic unit:

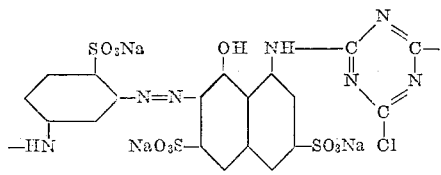

Example 12

(a) *Preparation of dye monomer.*—A solution of 9.4 parts of 2,4-diaminobenzene-sulfonic acid in 50 parts of water and enough 2 N NaOH to give a pH of 7 was cooled to 0° to 5° C. and added to an agitated slurry of cyanuric chloride prepared by adding a solution of 9.25 parts of cyanuric chloride in 40 parts of acetone to 250 parts of cold (0° to 5° C.) water. The resulting mixture was agitated at 0° to 5° C. for 1.5 hours while the pH was maintained at 8 with 2 N Na₂CO₃. The pH was then adjusted to 7 with 2 N HCl, 13 parts of 10 N HCl were added followed by 12.2 parts of 5 N NaNO₂. The solution of the diazonium salt was agitated at a temperature of 0° to 5° C. for 30 minutes and the pH was then adjusted to 6 with 2 N Na₂CO₃. This solution was then added all at once to an ice cold solution prepared by dissolving 17 parts of 1-amino-8-naphthol-3,6-disulfonic acid in 100 parts of water with enough 10 N NaOH to give a pH of 7, and in addition, 8 parts of Na₂CO₃. The mixture was then held at 5° to 15° C. for one hour to give a solution of a violet azo dye consisting essentially of a product having the structure

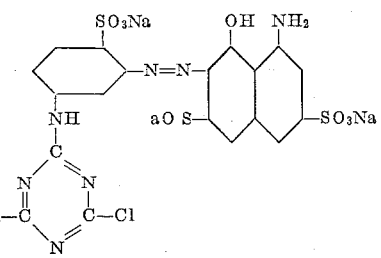

(b) *Polymerization of dye monomer.*—The above dye monomer was then polymerized by heating the violet solution at 35° to 40° C. for 1.5 hours while the pH was maintained at 8 with 2 N Na₂CO₃. The pH was then adjusted to 7 with 2 N HCl and the solution was cooled to 20° C., salted and filtered. The filter cake was dried to give 33 parts of a polymeric violet dye.

Example 13

By substituting in Example 12, 14.2 parts of 1-(2-methyl-4-amino-5-sulfophenyl)-3-methyl-5-pyrazolone in place of the 17 parts of 1-amino-8-naphthol-3,6-disulfonic acid, a polymeric dye which dyes cotton yellow shades was obtained. The dye thus produced, before it is polymerized, has the probable structure

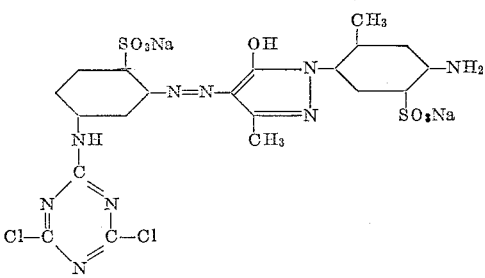

Example 14

A copolymeric dye which dyes cotton brown shades was prepared by substituting in Example 12 a mixture of 11.9 parts of 1-amino-8-naphthol-3,6-disulfonic acid and 3.3 parts of 1-(m-aminophenyl)-5-pyrazolone-3-carboxylic acid for the 17 parts of 1-amino-8-naphthol-3,6-disulfonic acid. Before polymerization, the reaction mass is believed to contain the following two monomers in admixture:

(a) The azo dye monomer formulated in Example 12, 70 mole-percent;

(b) An azo dye monomer of the formula

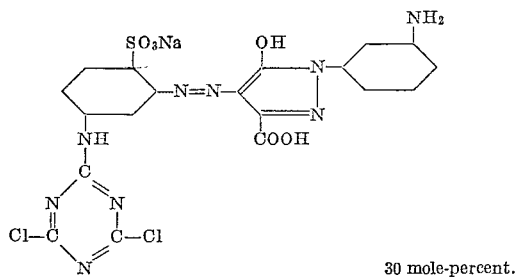

30 mole-percent.

*Example 15*

In 150 parts of water are dissolved 18.8 parts (0.1 mole) of 2,4-diaminobenzene-sulfonic acid at pH 7 with 10 N NaOH. The solution is then cooled to 0° to 5° C. and a solution of 18.5 g. (0.1 mole) of cyanuric chloride in 80 parts of acetone is added along with enough ice to keep the temperature below 5° C. The reaction mass is agitated at 0° to 5° C. for two hours. The pH is then adjusted to and maintained at 5 to 6, using 2 N $Na_2CO_3$, while agitating the mass at the same temperature for one hour. The compound thus formed has the probable structure

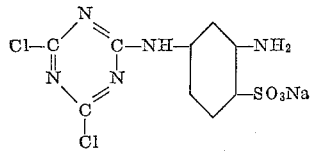

To this cold solution are added 28 parts of 10 N HCl followed by 24.5 parts of 5 N $NaNO_2$. This solution is agitated at 0° to 5° C. for 30 minutes and the pH is then adjusted to 6 with 2 N $Na_2CO_3$.

The solution of diazonium compound thus obtained is added to a solution, at 0° C. to 5° C., of 2-amino-8-naphthol-6-sulfonic acid which had been prepared by dissolving 23.9 parts (0.1 mole) of said amino-naphthol in 100 parts of water maintained at pH 7 with 10 N NaOH, followed by addition of 16.0 parts of sodium carbonate.

The coupling solution is agitated at 0° to 5° C. for one hour and the pH is adjusted to 7 with 2 N HCl. The reaction mass is then agitated at 35° to 40° C. for one hour while the pH is maintained at 8 with 2 N $Na_2CO_3$ and finally agitated at room temperature for 3½ days. It is salted with 375 parts of NaCl, filtered, and the filter cake is dried to give 150 parts of red powder.

When applied to cotton broadcloth, this dye gives a 92.2% fixation, and produces red dyeings of very good wash-fastness. The repeating unit of this polymer has the structure

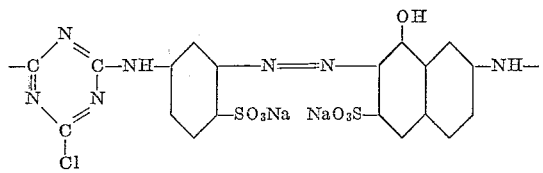

When the above synthesis is repeated using a 0.43 mole excess of 2-amino-8-naphthol-6-sulfonic acid, the excess acts as a chain stopper, resulting in the formation of some monomeric dye, and the mixture gives but a 63% fixation on the same cloth.

PART II.—DYEING

The mode of application of our novel compounds to fiber having reactive OH or $NH_2$ groups is not much different from that employed with other reactive dyes now on the market. The following example will illustrate the procedure:

A 4.15% aqueous solution of the polymeric dye produced in Example 1 was padded on cotton broadcloth at 70° C. in such a manner that the increase in weight by the fabric was 60%. After the fabric was dried it was repadded in the same manner with a solution which contained 25% sodium chloride and 1.2% sodium hydroxide. The wet fabric was steamed for two minutes and then scoured at the boil for two minutes with a solution containing 0.3% sodium carbonate and 0.2% of the condensation product of 20 moles of ethylene oxide with one mole of a $C_{18}$ alcohol. The fabric was rinsed in warm water, and dried.

The above dyeing procedure may be used with any of the dyes produced in the above examples. Furthermore, the padding with the polymeric dye may be done at optional temperatures, ranging from ambient temperature to the boiling point of the padding solution.

The resulting dyeings are characterized by strong shades and good fastness to washing, soaping and crocking. Furthermore the percentages of fixation and the build up qualities are generally higher than obtainable by the corresponding monomeric reactive dyes.

The percentage fixation of a given dye upon a given fabric is determined as follows:

(a) After padding the fabric with the dye polymer and drying, as in the above example, prior to repadding, a weighed sample of the fabric is dissolved in a fixed quantity of 70% sulfuric acid, and the light absorption of the solution is determined by the aid of a spectrophotometer.

(b) A sample of equal weight of the same fabric after the dyeing operation has been completed (including the steaming, scouring, rinsing and drying steps) is dissolved in a corresponding quantity of 70% sulfuric acid, and the light absorption of the resulting solution is determined as in step a).

Designating by $S_a$ and $S_b$, respectively, the two quantities obtained for the spectrophotometric absorption in the two cases, the percentage fixation is given by $$p = \frac{S_b}{S_a} \times 100$$

It will be understood that the details of the above examples may be varied widely without departing from the spirit of this invention. For instance, instead of preparing the intermediate monomers or isolating the final polymers as sodium sulfonates, they may be prepared and isolated in the form of any other convenient alkali-metal sulfonates, for instance those of potassium or lithium. Other variations and modifications will be readily apparent to those skilled in the art.

In the claims below the expression "analogous monomeric reactive dyes" is to be understood as referring to dyes of formula H—D—NH—G—X, wherein D and G have the same significance as in the corresponding polymer claimed, while X is an optional amino group, such as the anilino group —NH—$C_6H_5$, which is often used in monomeric reactive dyes to replace the second Cl group of the cyanuric chloride component.

In the novel polymers above described the number of repeating units in the polymer is not less than 2. The upper limit of this number is immaterial so long as the recovered polymer possesses the quality of being soluble in water to a concentration at least equal to that commonly used in dye baths, e.g. 0.5 to 4% by weight.

We claim as our invention:

1. A water-soluble, fiber-reactive, linearly polymeric dye in which the basic monomer unit of said linear polymeric dye has the formula

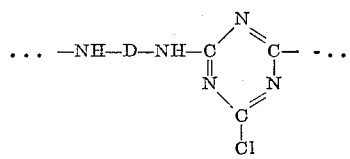

where D is a dye chromophore selected from the group consisting of azo, anthraquinone, dioxazine, and copper phthalocyanine chromophores, said dye chromophore containing at least one alkali metal sulfonate group, said polymeric dye being terminated by radicals selected from the group consisting of members of said basic monomer unit and hydroxy triazine radicals.

2. A water-soluble, fiber-reactive, linearly polymeric azo dye in which the basic monomer unit of said linear polymeric azo dye has the formula

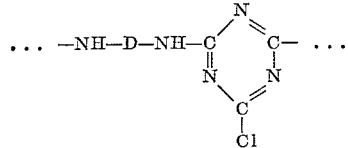

where D is an azo dye chromophore containing at least one alkali metal sulfonate group, said polymeric dye being terminated by radicals selected from the group consisting of members of said basic monomer unit and hydroxy triazine radicals.

3. A water-soluble, fiber-reactive, linearly polymeric phthalocyanine dye in which the basic monomer unit of said linear polymeric dye has the formula

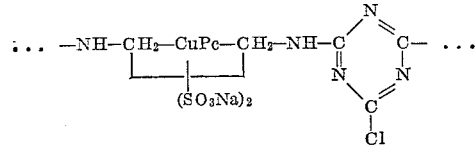

where CuPc is the copper phthalocyanine dye nucleus, said polymeric dye being terminated by radicals selected from the group consisting of members of said basic monomer unit and hydroxy triazine radicals.

4. A water-soluble, fiber-reactive, linearly polymeric anthraquinone dye in which the basic monomer unit of said linear polymeric dye has the formula

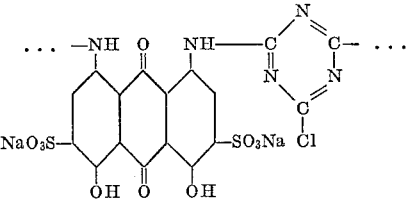

said polymeric dye being terminated by radicals selected from the group consisting of members of said basic monomer unit and hydroxy triazine radicals.

References Cited in the file of this patent

UNITED STATES PATENTS

| | | |
|---|---|---|
| 2,238,400 | Scott | Apr. 15, 1941 |
| 2,391,164 | Kaiser | Dec. 18, 1945 |
| 2,722,527 | Wehrli | Nov. 1, 1955 |
| 2,749,335 | Liechti | June 5, 1956 |
| 2,763,640 | Riat | Sept. 18, 1956 |
| 2,772,136 | Hannay | Nov. 27, 1956 |
| 2,835,663 | Benz | May 20, 1958 |
| 2,849,574 | Gasper | July 22, 1958 |
| 2,880,207 | Schroeder | Mar. 31, 1959 |
| 2,914,530 | Schrader | Nov. 24, 1959 |

FOREIGN PATENTS

| | | |
|---|---|---|
| 754,071 | Great Britain | Aug. 1, 1956 |
| 543,218 | Belgium | May 29, 1956 |